US012758904B1

(12) United States Patent
Cloud

(10) Patent No.: US 12,758,904 B1
(45) **Date of Patent: *Oct. 13, 2026**

(54) MOPPING SYSTEM WITH FILTRATION

(71) Applicant: Jeremy Michael Cloud, Indian Trail, NC (US)

(72) Inventor: Jeremy Michael Cloud, Indian Trail, NC (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/615,963

(22) Filed: Mar. 25, 2024

Related U.S. Application Data

(63) Continuation of application No. 17/061,387, filed on Oct. 1, 2020, now Pat. No. 11,938,428, which is a continuation-in-part of application No. 15/435,945, filed on Feb. 17, 2017, now abandoned.

(60) Provisional application No. 62/296,505, filed on Feb. 17, 2016.

(51) Int. Cl.

| | |
|---|---|
| ***B01D 35/26*** | (2006.01) |
| ***A47L 11/29*** | (2006.01) |
| ***A47L 11/40*** | (2006.01) |
| ***B01D 29/60*** | (2006.01) |
| ***B01D 35/157*** | (2006.01) |
| ***C02F 1/00*** | (2023.01) |
| *C02F 103/00* | (2006.01) |

(52) U.S. Cl.
CPC .............. *B01D 35/26* (2013.01); *A47L 11/29* (2013.01); *A47L 11/4027* (2013.01); *B01D 29/605* (2013.01); *B01D 35/1573* (2013.01); *C02F 1/001* (2013.01); *C02F 1/008* (2013.01); *B01D 2201/167* (2013.01); *B01D 2201/48* (2013.01); *C02F 2103/002* (2013.01); *C02F 2201/005* (2013.01); *C02F 2209/40* (2013.01); *C02F 2209/42* (2013.01); *C02F 2301/046* (2013.01)

(58) Field of Classification Search
None
See application file for complete search history.

(56) References Cited

U.S. PATENT DOCUMENTS

| | | | | |
|---|---|---|---|---|
| 5,601,659 A * | 2/1997 | Rohrbacher | ............ | E01H 1/001 134/21 |
| 2011/0203613 A1* | 8/2011 | Roberts | .................. | A47L 13/58 134/10 |
| 2014/0263104 A1* | 9/2014 | Kepner | .................. | A47L 13/58 210/791 |
| 2014/0263105 A1* | 9/2014 | Kontorovich | ........... | A47L 13/59 210/791 |

(Continued)

*Primary Examiner* — Richard C Gurtowski
(74) *Attorney, Agent, or Firm* — Schrantz Law Firm, PLLC; Stephen D. Schrantz

(57) ABSTRACT

A main housing provides a first reservoir and a second reservoir. Water flows from the first reservoir to the second reservoir. A draining aperture in the first reservoir directs water from the first reservoir to the second reservoir. The water may be flushed from the first reservoir to the second reservoir. In another embodiment, the water may flow directly from the first tank to the second tank without the flush. A pump circulates water from the second reservoir to the first reservoir. The pump directs the water through a filtration system to filter the water to remove at least some of the dirt, debris, and other contaminants from the water. The filtered water is then returned to the first reservoir. An overflow relief in a dividing wall of the first reservoir directs overflow water to the second reservoir.

22 Claims, 14 Drawing Sheets

(56) References Cited

U.S. PATENT DOCUMENTS

| | | | | |
|---|---|---|---|---|
| 2015/0151992 | A1* | 6/2015 | Mortimer ................ | C02F 1/006<br>210/97 |
| 2015/0190030 | A1* | 7/2015 | Johnson .................. | A47L 13/59<br>15/264 |
| 2017/0321412 | A1* | 11/2017 | Peters .................... | G01N 27/10 |

* cited by examiner

MOPPING SYSTEM WITH FILTRATION

CROSS-REFERENCE TO RELATED APPLICATIONS

This application claims priority to and is a continuation of U.S. patent application Ser. No. 17/061,387 filed on Oct. 1, 2020 entitled "WATER CONTAINMENT UNIT AND FILTRATION SYSTEM" which is a continuation in part of U.S. patent application Ser. No. 15/435,945 filed on Feb. 17, 2017 entitled "WATER CONTAINMENT UNIT AND FILTRATION SYSTEM" which is a continuation in part of U.S. Patent Application No. 62/296,505 filed on Feb. 17, 2016 entitled "WATER CONTAINMENT UNIT AND FILTRATION SYSTEM."

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention is related to a water containment system and method of operation. More specifically, the present invention is related to a water containment unit with a filtration system for filtering liquid circulated throughout the water containment unit.

Mopping a floor traditionally requires a bucket and a mop. As the user mops the floor, dirt, debris, and other contaminants collect within the bucket to dirty and/or other contaminate the water. The user then continues to clean the floor with this dirty, contaminated water. The increased amount of dirt, trash, and other debris decreases the effectiveness of mopping the floor. Microorganisms may also be introduced into the bucket each time the mop is rinsed in the bucket. The user then spreads these microorganisms across the floor by continuing to use the dirty, contaminated water.

The user must then empty, clean, and refill the bucket to continue cleaning the floor to avoid continuing to clean the floor with the dirty, contaminated water. Refilling the water in the bucket reduces the efficiency of the user. The user must spend time refilling the bucket. This time could be effectively used for cleaning the floor. Furthermore, refilling the water in the bucket increases water usage.

The user must find a place to dispose of the dirty water. The user may expose this dirty water to the environment when dumping or otherwise removing the water from the bucket. The user must then add additional water to the bucket to refill the bucket, thus increasing water usage.

II. Known Art

Patents and patent applications disclosing relevant information are disclosed below. These patents and patent applications are hereby expressly incorporated by reference in their entirety.

U.S. Publication No. 20050076465 to Rousey on Apr. 14, 2015 ("the '465 publication") teaches a floor cleaning solution filtering system that includes a mop bucket defining a cleaning solution basin. A pump taught by the '465 publication is exteriorly mounted on the bucket and is in fluid communication with the cleaning solution basin. A filter system taught by the '465 publication is exteriorly mounted on the bucket, in fluid communication with the cleaning solution basin, and operationally connected to the pump. The pump taught by the '465 publication draws fluid from the cleaning solution basin through the filter system for return to the basin after the cleaning solution has been filtered. The bucket taught by the '465 publication may include a single basin or a dual basin.

U.S. Publication No. 20110203613 to Roberts on Aug. 25, 2011 ("the '613 publication") teaches a mop bucket with an integrated water filtration system. A manual or electric pump taught by the '613 publication may be utilized to circulate water from the bucket through the filtration system. The pump taught by the '613 publication may also be utilized to provide water pressure to nozzles that emit streams of water for rinsing the mop head. The filtration system taught by the '613 publication may include one or more filters capable of removing particles and microbes from the water. A germ-killing light taught by the '613 publication, such as an ultraviolet light, may be incorporated into the filtration system to kill any microbes in the water. The mop bucket taught by the '613 publication may be mounted to a wheeled cart to facilitate movement. A re-chargeable battery taught by the '613 publication may be used to provide power to the pump and the germ-killing light.

SUMMARY OF THE INVENTION

A main housing provides a first reservoir and a second reservoir. The user places the mop into the first reservoir for the cleaner water for mopping the floors. Water flows from the first reservoir to the second reservoir. A draining aperture in the first reservoir directs water from the first reservoir to the second reservoir. The water may be flushed from the first reservoir to the second reservoir. In another embodiment, the water may flow directly from the first reservoir to the second reservoir without the flush.

The dirtier water remains within the second reservoir. A pump circulates water from the second reservoir to the first reservoir. A pump intake takes in water from the second reservoir. The pump directs the water through a filtration system to filter the water to remove at least some of the dirt, debris, and other contaminants from the water. The filtered water is then returned to the first reservoir.

Outlets direct the filtered water from the second reservoir into the first reservoir. The first reservoir continues to collect the water as the pump directs the water from the second reservoir to the first reservoir. A divider wall separates the first reservoir from the second reservoir. The divider wall provides a recess that allows overflow from the first reservoir to flow into the second reservoir. Such a recess prevents the first reservoir from overflowing into the floor.

Another embodiment provides a trapping conduit that enables water to flow from the first reservoir to the second reservoir. The trapping conduit provides two vertical pathways, a downward path from the first reservoir and an upward path that leads to the second reservoir. Any sediment, sand, or other sinking debris flows downward into the trapping conduit. The upward path reduces the amount of such sediment, sand, and other sinking debris that flows from the first reservoir to the second reservoir. The user can then open the trapping conduit to remove the sediment, sand, and other sinking debris.

It is an object of the present invention to provide a versatile water filtration system.

It is another object of the present invention to provide a filter system that provides a user with cleaner water.

It is another object of the present invention to reduce water usage.

It is another object of the present invention to increase efficiency of cleaning floors.

It is another object of the present invention to reduce time spent emptying and refilling a mop bucket.

It is another object of the present invention to provide cleaner water for mopping floors.

It is another object of the present invention to promote the usage of cleaner water to mop floors.

It is another object of the present invention to remove sinking debris and floating debris from a cleaner reservoir for use during mopping.

It is another object of the present invention to provide a rolling attachment to simplify movement of the floor machine.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
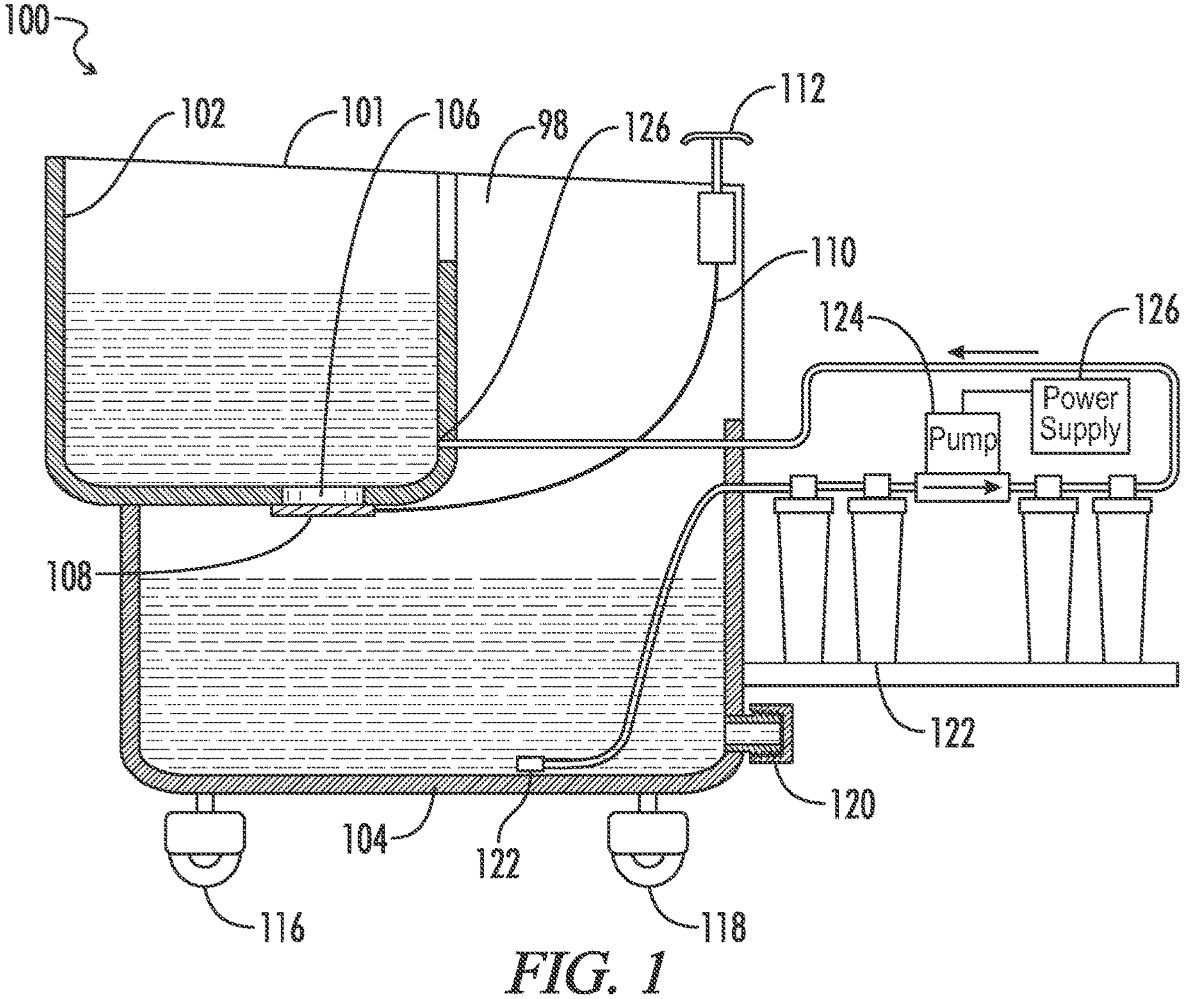
FIG. 1 is a sectional view of one embodiment of the present invention.

FIG. 1 shows a sectional view of a water containment unit with filtration system generally shown as 100. The water containment unit 100 provides a housing 101 supported by wheels 116, 118. In one embodiment, the water containment unit serves as a mopping system that filters water to provide user with cleaner water for mopping the floors. Wheels 116, 118 increase the mobility of the housing 101 to simplify the process of cleaning floors.

The housing 101 provides a first reservoir 102 and a second reservoir 104. The first reservoir 102 provides the cleaning water source to be applied to the floor. A wringer may attach to the housing at opening 98 to wring the used water into the second reservoir 104. The second reservoir 104 stores the water to be filtered and circulated to the first reservoir 102.

Such recirculation of the water between the first reservoir 102 and second reservoir 104 decreases water usage. The filtering of the water increases the user's ability to continue using the same water without requiring dumping and refilling of the water.

The housing 101 may store water to clean the floors. A cleaning solution may also be stored within housing 101. A dispenser may also attach to the housing to dispense a cleaning solution into either the first reservoir, second reservoir, or both. In another embodiment, the dispenser may release a fluid that causes the debris and other contaminants to clump together for easy removal from the unit.

Figure 3:
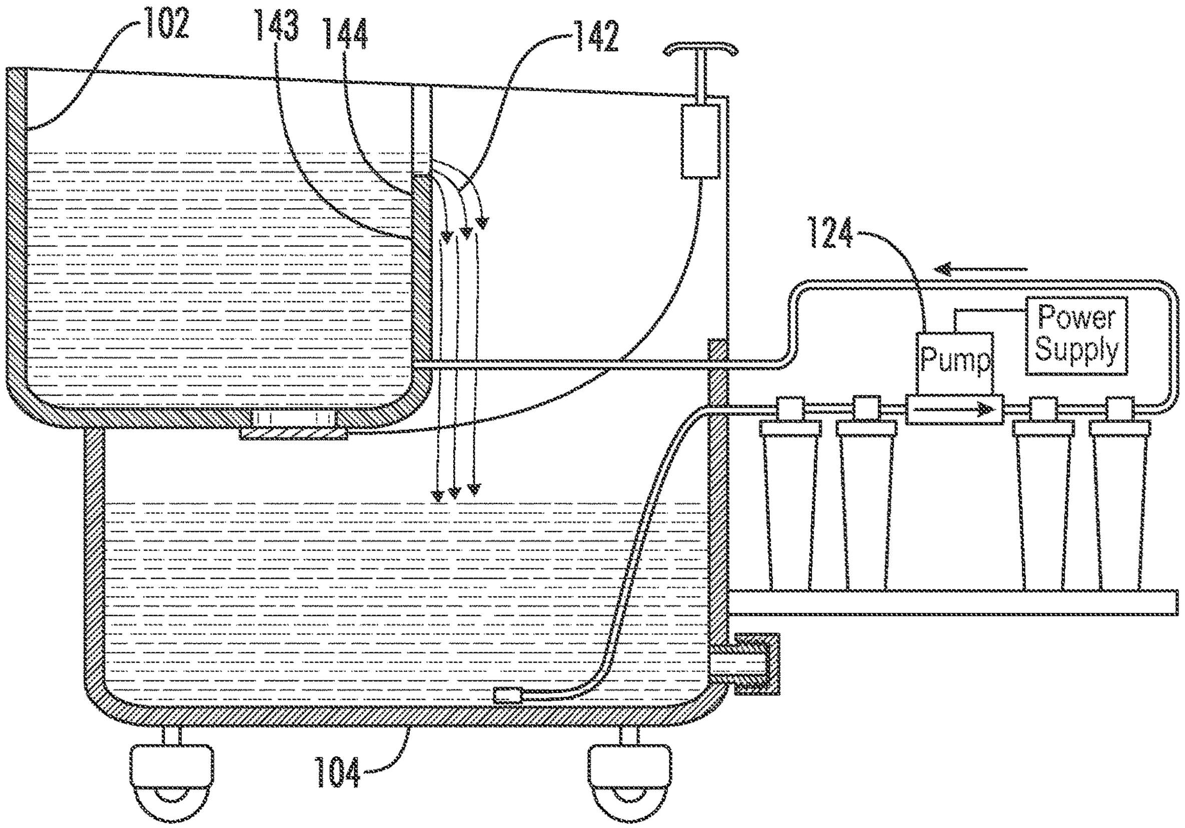
FIG. 3 is a sectional view thereof.

The housing 101 enables water to circulate from the first reservoir 102 to the second reservoir 104. The water from the first reservoir 102 travels to the second reservoir 104. The water may flow through a draining aperture 106 to the second reservoir 104. The water may also travel across a recess in the divider wall 143, such as the overflow relief 144 as shown in FIG. 3.

Figure 4:
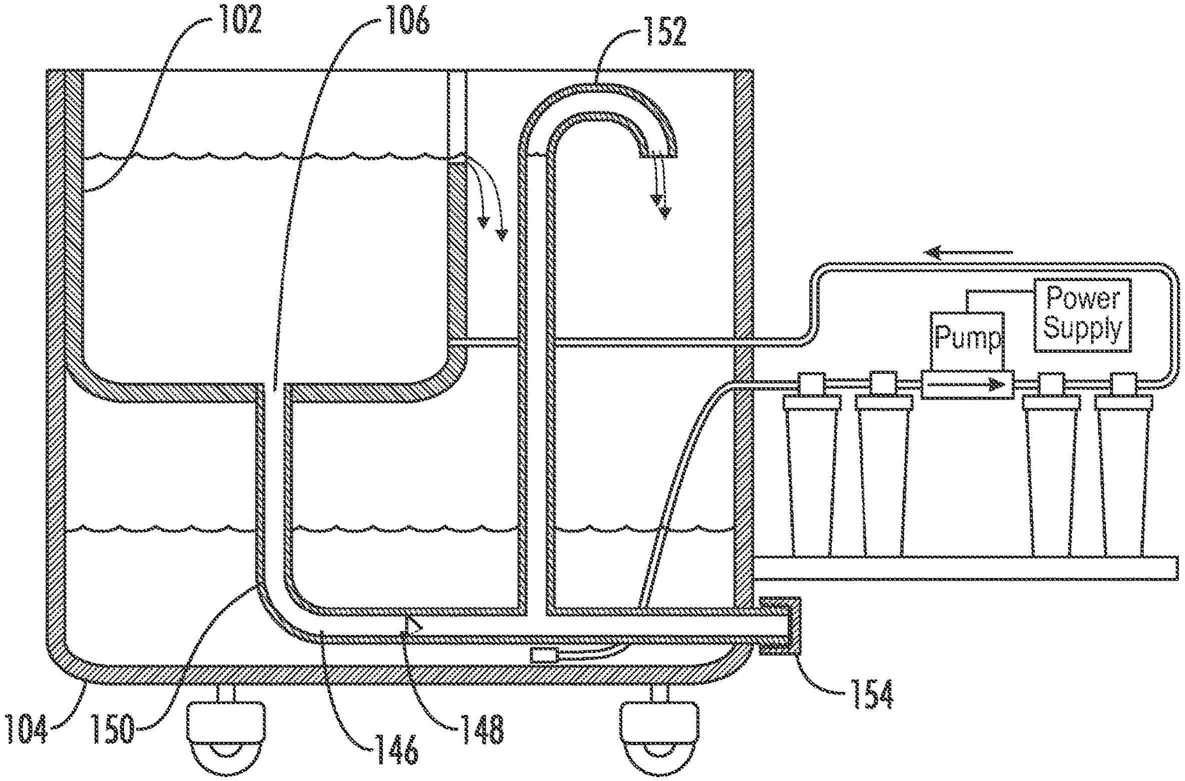
FIG. 4 is a sectional view of one embodiment of the present invention.

As indicated above, the first reservoir 102 serves as the cleaning source for the user. The second reservoir 104 serves as the waste water storage. As the water within the first reservoir 102 becomes dirty and/or contaminated, the user may flush the contents of the first reservoir 102 into the second reservoir 104. In another embodiment, the contents of the first reservoir 102 automatically flow to the second reservoir 104 as shown in FIG. 4.

Releasing water from the first reservoir 102 into the second reservoir 104 provides a cleaner source for cleaning the floors. The first reservoir 102 separates the cleaning source from the waste water stored within the second reservoir 104.

The unit 100 also allows water from the second reservoir 104 to flow to the first reservoir 102. A pump 124 takes in water from the second reservoir 104 at pump intake 122. The pump 124 directs the water from the second reservoir 104 through a filtration system 122. The filtration system 122 may be located before the pump 124, after the pump 124, or both before and after the pump 124. The pump 124 directs the water through the filtration system to filter the water.

The filtration system removes contaminants from the water. The filtration system 122 reduces the contaminants and debris within the water. The pump 124 then directs the water to the first reservoir 102 through outlet 126.

The pump 124 must be powered to operate. The pump may be an electric pump or a gas powered pump. The pump 124 connects to a power source 126. The power source 126 may be a battery source or a power plug to be plugged into the wall. The system may also plug into the wall to charge the battery during use.

The housing 101 also provides a drain outlet 120. The drain outlet 120 enables the user to drain water from the housing 101. Because the water flows to the second reservoir 104, the drain is located in the second reservoir 104. The drain could also be located in the first reservoir 102. In such an embodiment, the user could filter the water before draining the system.

Continuing to refer to FIG. 1, the water from the first reservoir 102 flushes into the second reservoir 104. The flushing body 108 seals or at least partially seals the draining aperture 106. The flushing body 108 may include, but is not limited to, an actuated gate valve, a flush valve, a flapper valve, a toilet valve, or other valves. The flushing handle 112 connects to a flushing arm 110 that adjusts the flushing body 108 between the open position and the closed position.

The user adjusts the flushing handle 112 to open or close the flushing body 108. When open, the flushing body 108 releases water from the first reservoir 102 into the second reservoir. The flushing body 108 closes to reduce the water flowing from first reservoir 102 into the second reservoir 104 as shown in FIG. 1.

Figure 2:
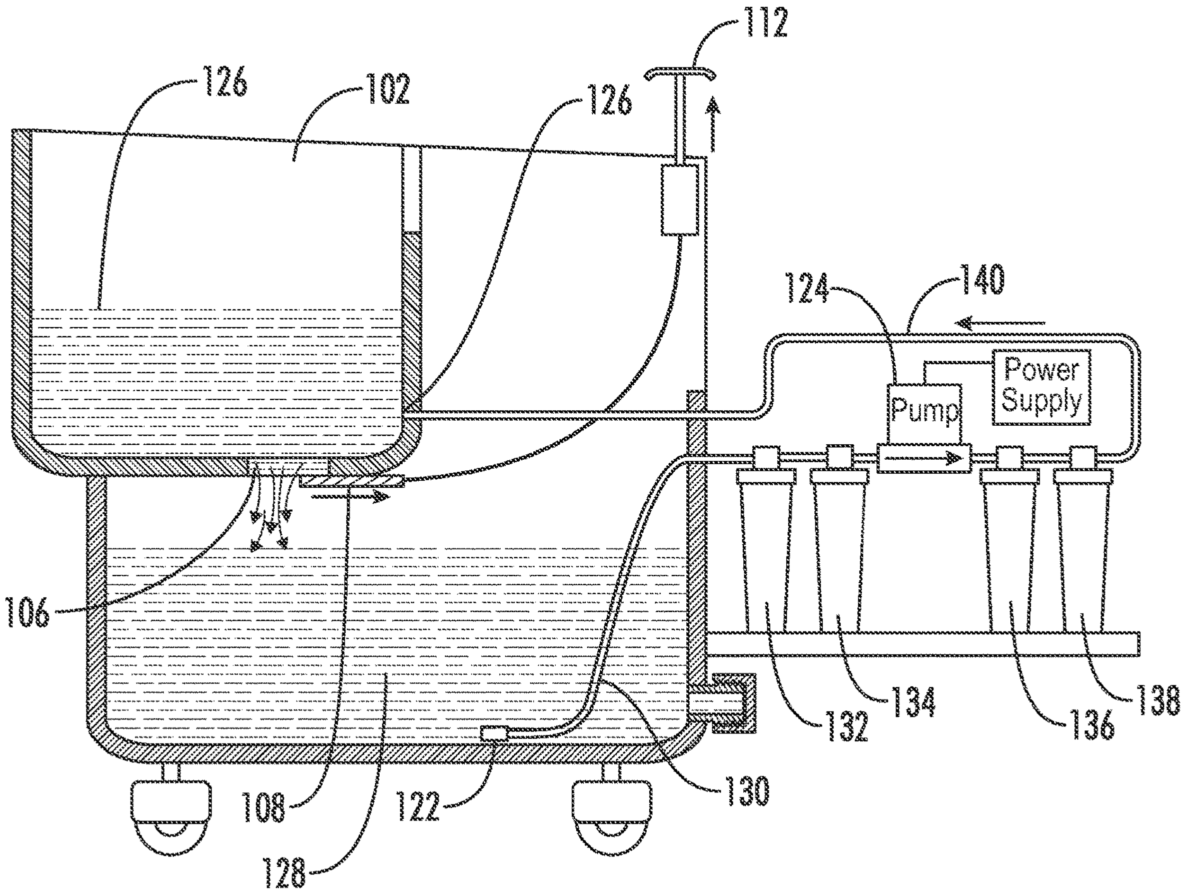
FIG. 2 is a sectional view thereof.

FIG. 2 shows the flushing of cleaning source water 126 from first reservoir 102 into the second reservoir 104. The second reservoir 104 stores the waste water 128. The user adjusts flushing handle 112 to open the flushing body 108. The flushing body 108 in the open position releases water from the first reservoir 102 through draining aperture 106 into the second reservoir 104.

The pump 124 takes in water through pump intake 122. The water flows from intake 122 through intake conduit 130 to the pump. Prior to reaching the pump 124, the water flows through filters 132, 134. Such a system filters the water prior to reaching the pump. These filters may range from 0.2 microns to 1000 microns.

The pump then directs the water through outlet conduit 140 to outlet 140. Prior to dispensing the filtered water into the first reservoir 102 via outlet 126, the water travels through filters 136, 138. These filters may also range from 0.2 microns to 1000 microns.

FIG. 3 shows the overflow capabilities of the present invention. To provide the user with the cleanest water source available from the water within the housing 101, the system continuously pumps and filters water from the second reservoir 104 to the first reservoir 102. Such an embodiment continuously pumps during use. Continuously pumping water into the first reservoir 102 could cause potential problems with water overflowing from the first reservoir 102. The continuous pumping could also cause too little water available for pump 124 such that the motor burns up.

To avoid these problems, the system provides a dividing wall with overflow relief 144. This overflow relief 144 provides a recess that is lower than the other walls of the first reservoir 102. The recess allows water to flow from the first reservoir to the second reservoir when the water level reaches the recess.

Overflow water 142 flows over overflow relief 144 at dividing wall when the water level reaches above the height of the recess found in dividing wall at overflow relief 144. Overflow water 142 flows into the second reservoir 104.

Enabling water to flow across the overflow relief 144 of dividing wall allows the system to remove floating debris/trash. The floating debris will not reach the filter due to the buoyance of the floating the debris. The overflow relief 144 of dividing wall allows the floating debris to float over the dividing wall into the second reservoir 104. Removing the floating debris from the first reservoir 102 reduces the possibility of the user accidentally placing the debris back on the clean floor.

FIG. 4 shows another embodiment of the present invention in which the water freely flows from first reservoir 102 to second reservoir 104. Trapping conduit 146 directs water from the first reservoir 102 to the second reservoir 104. The trapping conduit 146 provides a downward path 150 and an upward path 152. The water can flow downwards and upwards through the trapping conduit 146.

However, sand, sediment, and other sinking debris will not flow as easily across the upward pathway 152. The upward pathway 152 reduces the amount of heavier contaminants entering the second reservoir 104. The heavier contaminants flow down draining aperture 106 into the trapping conduit 146. One way valve 148 allows the water and contaminants to flow past the valve. However, the valve does not allow water to return through the valve 148.

Trap drain 154 allows the user to empty the contents of the trapping conduit 146. The user opens the trap drain 154 to empty the first reservoir 102 and the contaminants within the trapping conduit 146.

Figure 5:
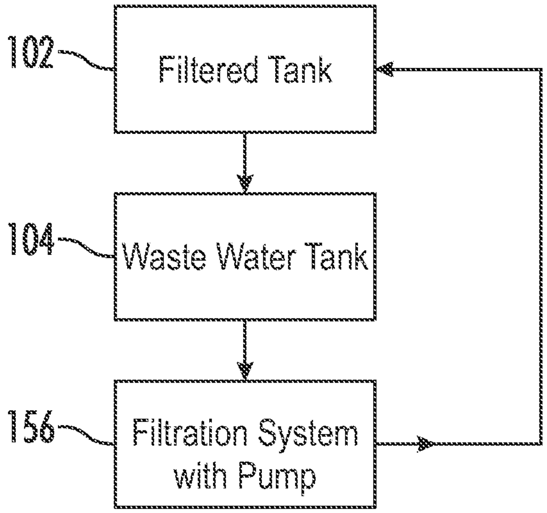
FIG. 5 is a flow chart of one embodiment of the present invention.
Figure 6:
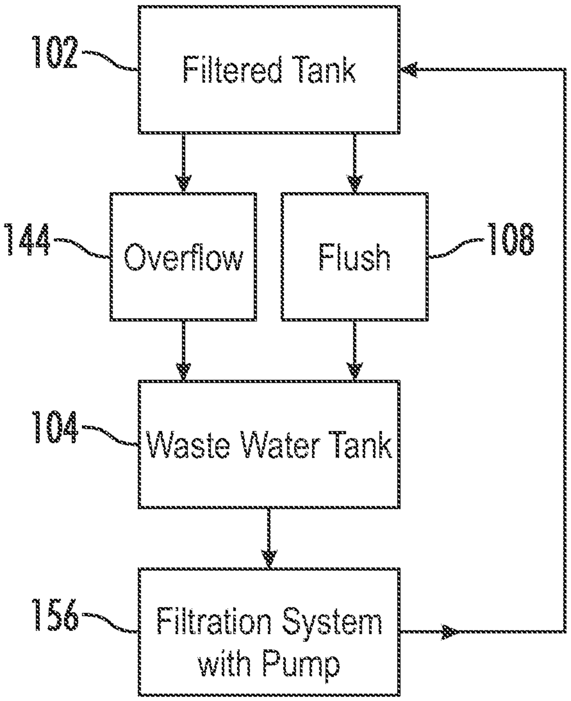
FIG. 6 is a flow chart of one embodiment of the present invention.

FIGS. 5 and 6 show different embodiments showing the flow of the water through the system. The water flows from the filtered tank into a waste water tank. A pump then returns the water from the waste water tank to the filtered tank. In the process of returning the water, the system filters the water through a filtration system before dispensing the filtered water into the filtered tank.

A filtered tank, such as the first reservoir 102, allows water to flow to the waste water tank, such as the second reservoir 104. This water may be flushed into the waste water tank. The water may also freely flow into the waste water tank. The water may also overflow from the filtered tank into the waste water tank across overflow relief 144 of divider wall.

A filtration system 156 with pump circulates the water from the waste water tank to the filtered tank. The filtration system filters the water from the waste water tank prior to returning the filtered water to the filtered tank.

The filtration system is constructed from either a single filter or multiple filters. The filtration system may be placed before the pump, after the pump, or both before the pump and after the pump.

FIG. 6 provides additional information concerning a flushing system. The flushing system provides continuous filtering and pumping of the water from the waste water tank to the filtered tank. The user can then flush the cleaning source from the filtered tank via flushing body 108. To prevent overflow of the filtered tank due to the continuous pumping of filtered water into the filtered tank, the filtered tank provides an overflow release, such as the recess at the overflow relief 144 of the divider wall, for the overflow water to flow from the filtered tank to the waste water tank.

Figure 7:
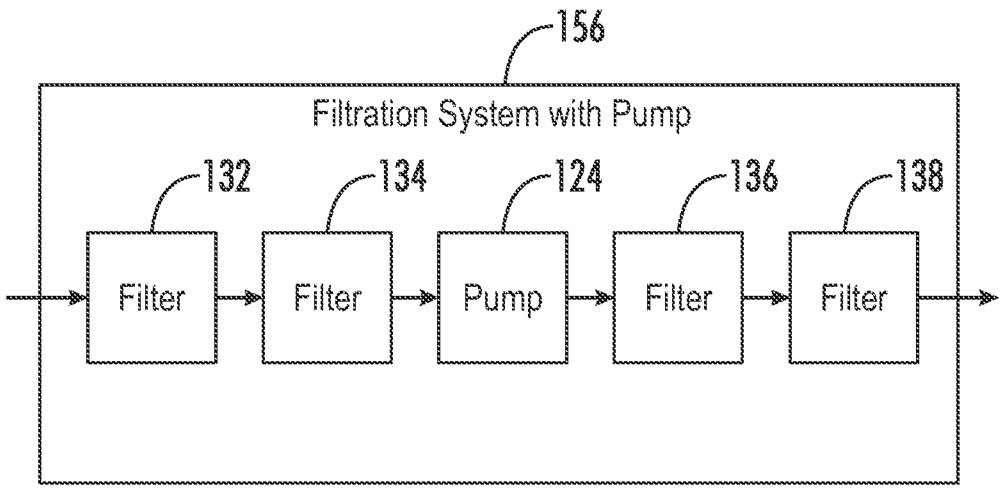
FIG. 7 is a schematic view of a filtration system with pump of one embodiment of the present invention.
Figure 8:
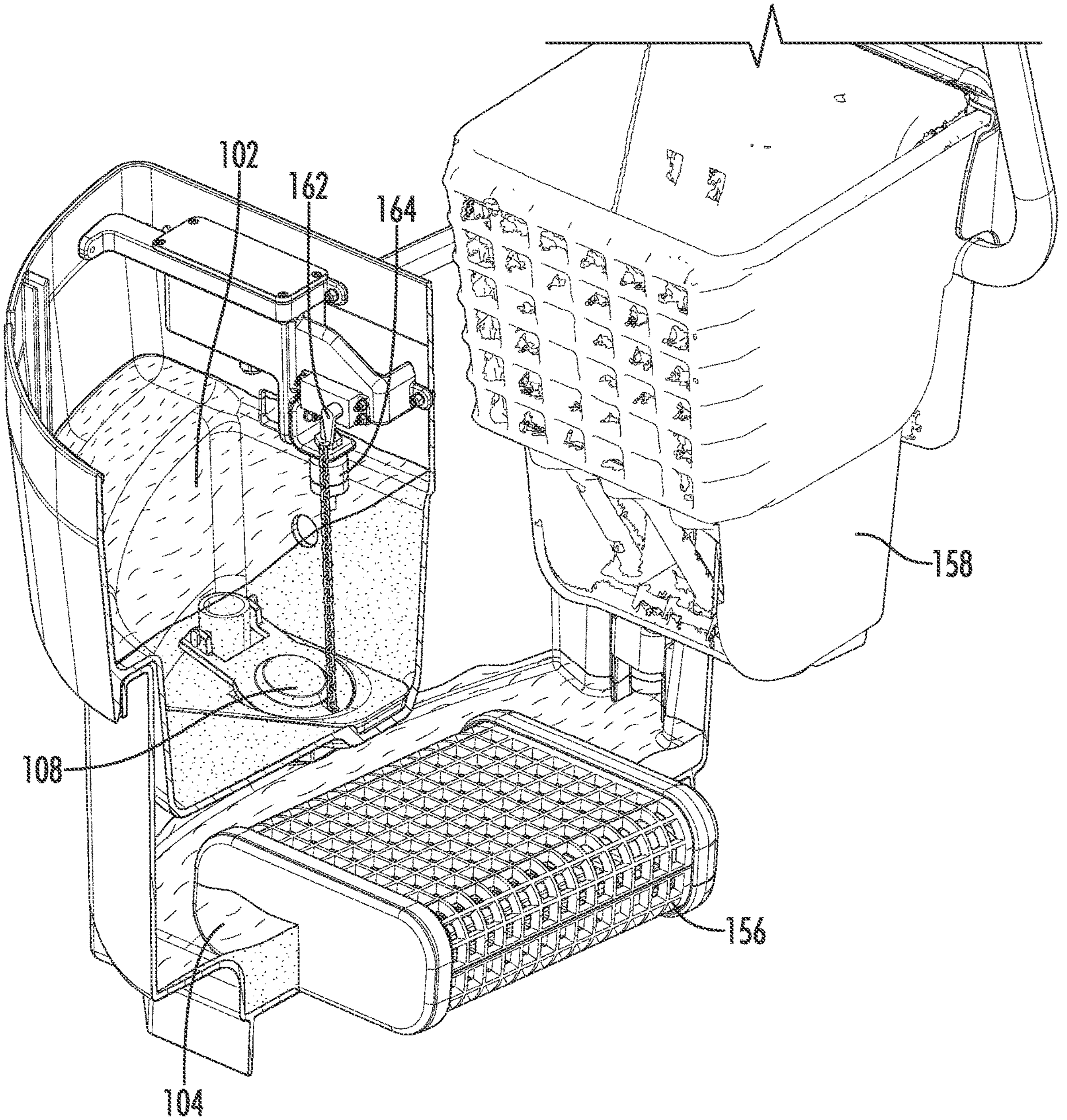
FIG. 8 is a sectional view of one embodiment of the present invention.

FIG. 7 shows the filtration system 156 with pump. The filtration system, as discussed above, can be placed in the path of the water as it is pumped to the pump. The filtration system can also be placed in the path of the water as it is pumped from the pump to the outlet for releasing the filtered water into the filtered tank. In another embodiment, two separate filtration systems are implemented in the system. One filtration system is located in the path of the water from the waste water tank to the pump. The second filtration system is located in the path of the water from the pump to the filtered tank.

FIG. 7 shows a filtration system in which the filters occur in the path both prior to the pump 124 and after the pump 124. Such a filtration system 156 provides filters 132, 134 prior to the water reaching the pump. The filtration system 156 also provides filters 136, 138 as the water travels from the pump 125 to the filtered tank. The pump 124 directs the water through filters 132, 134, 136, 138 as the water travels from the waste water tank to the filtered tank.

FIG. 7 shows a multistage filtration system in which the water is filtered twice through filters 132, 134 prior to reaching the pump. The water is filtered twice through filters 136, 138 after the pump. These filters 132, 134 prior to the pump 124 range from 0.2 microns to 1000 microns, preferably 25 microns to 200 microns. These filters 136, 138 after pump 124 range from 0.2 microns to 1000 microns, preferably 0.2 microns to 25 microns.

FIGS. 8-11 show another embodiment of the present invention that uses a flapper valve as the flush body 108. The flapper valve controls the flow of the fluids, such as water and cleaning solution, from the first reservoir 102 to the second reservoir 104. The flapper valve connects to the actuator 162 that controls the opening and closing of the flapper valve. The actuator 162 may be controlled by the user or by computer. The user may flush the contents of the first reservoir or the system may flush the contents by a different action, such as wringing a mop.

FIGS. 8-11 also show the float switch 164 that activates the pump to transfer water from the second reservoir to the first reservoir. The float switch 164 controls operation of the filtration system 156 with pump. The float switch activates the pump when water level in the first reservoir 102 is low. The float switch deactivates the pump when water level in the first reservoir 102 is sufficient.

In one embodiment, wringer 158 is secured to the mopping system. The wringer 158 drains to the second reservoir 104. The wringer 158 squeezes the water from the mop and drains the water to the second reservoir 104. The water drained from the wringer 158 can then be filtered and transferred to the first reservoir via the filtration system 156 and pump. As discussed below, the operation of the wringer 158 may also control operation of the actuator 162 and the flushing body 108, such as the flapper valve.

Figure 9:
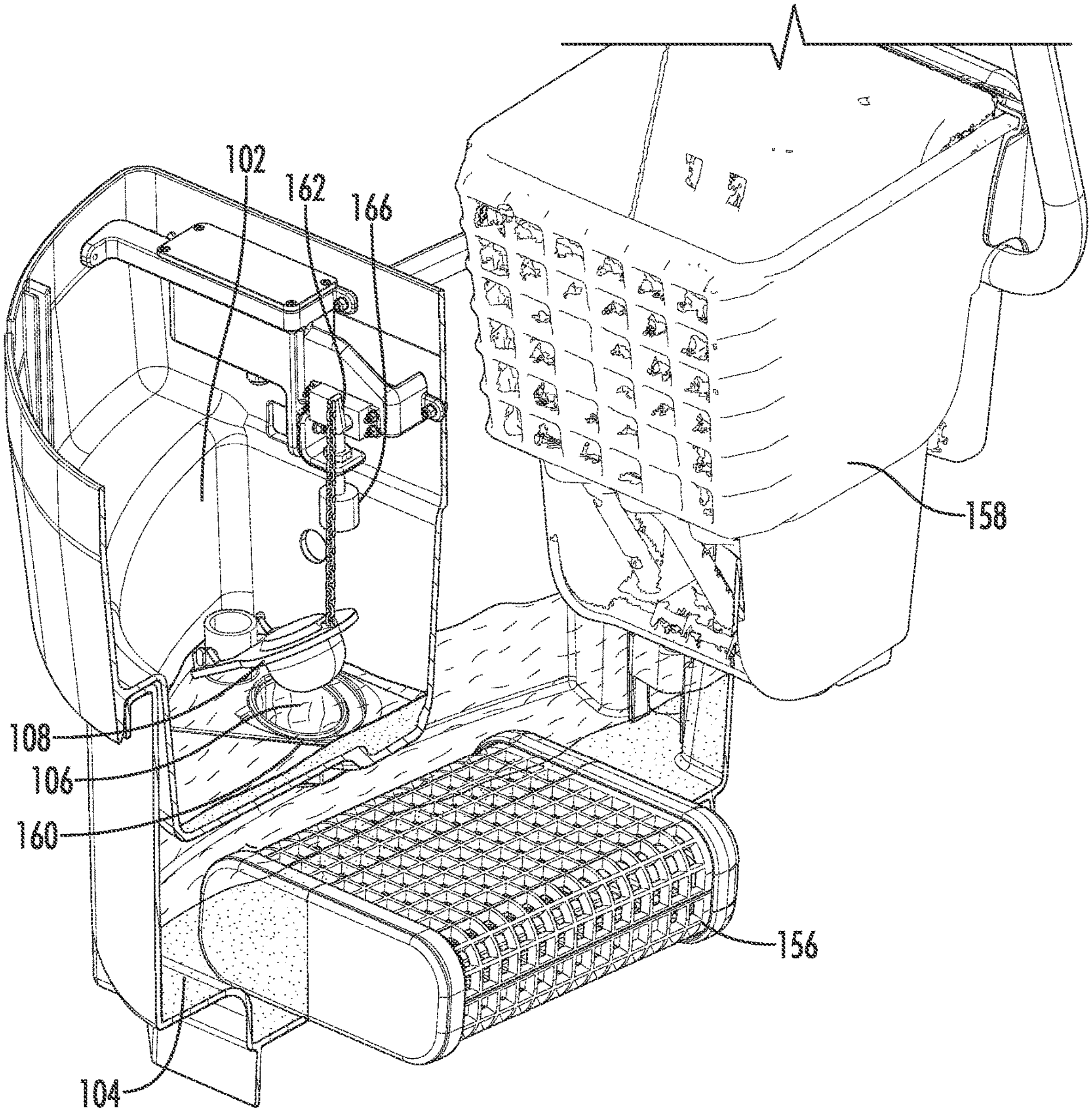
FIG. 9 is a sectional view thereof.

FIG. 9 shows the actuator 162 opening the flapper valve to draining aperture 106. The flapper valve closes on a valve recess 160. The valve recess 160 is a recess in the bottom of the first reservoir 102 to allow for the flapper valve 160 to close the draining aperture 106. The flapper valve contacts the valve recess 160 on the first reservoir to seal the first reservoir.

The actuator 162 opens the flapper valve to release the fluid, such as water and/or cleaning solution, from the first reservoir 102 to the second reservoir 104. The fluid flows from the first reservoir 102 to the second reservoir 104 through the draining aperture 106.

Releasing fluid from the first reservoir 102 to the second reservoir 104 lowers the float switch 164. Lowering of the float switch 164 indicates that the water is lower within first reservoir 102. The filtration system 156 and pump activate due to the low fluid level detected in the first reservoir 102. The pump transfers filtered fluid from the second reservoir 104 to the first reservoir until the float switch 164 reaches the appropriate level. The float switch 164 then turns off the pump and filtration system 156.

Figure 10:
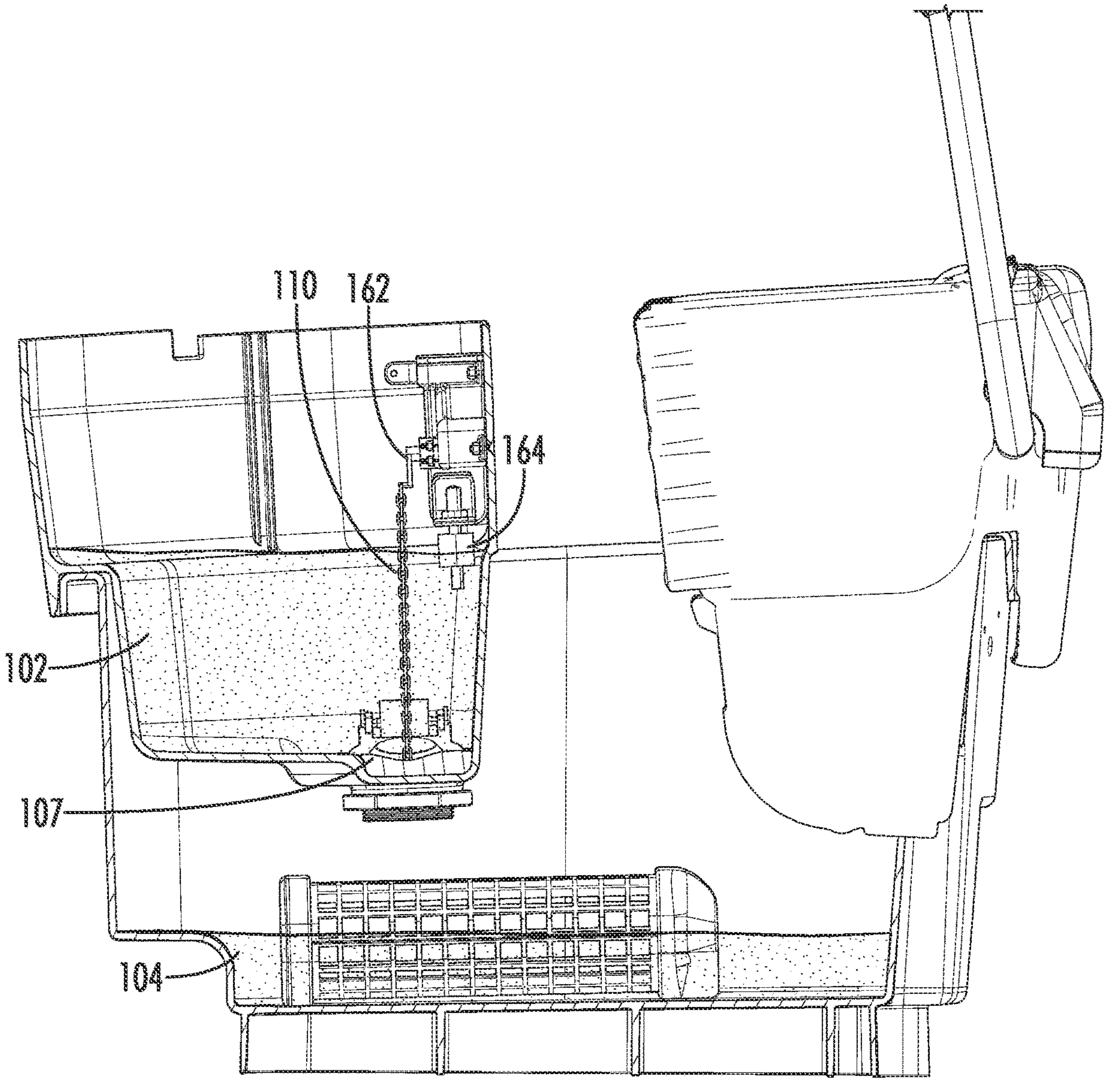
FIG. 10 is a sectional view thereof.

FIG. 10 shows the flapper valve 107 closed to limit fluid flowing from the first reservoir 102 to the second reservoir. The actuator 162 opens and closes the flapper valve 107 via the flushing arm 110, which may be a chain or other adjustment system that opens and closes the flapper valve 107. In one embodiment, the actuator 162 rotates the flushing arm 110 to open and close the valve 107.

The fluid level in the first reservoir is sufficient to float the float switch 164. With the float switch 164 floating, the pump does not transfer fluid from the second reservoir 104 to the first reservoir as the pump is deactivated. The float switch 164 detects sufficient fluid level in the first reservoir 102 when the float switch 164 is floating.

Figure 11:
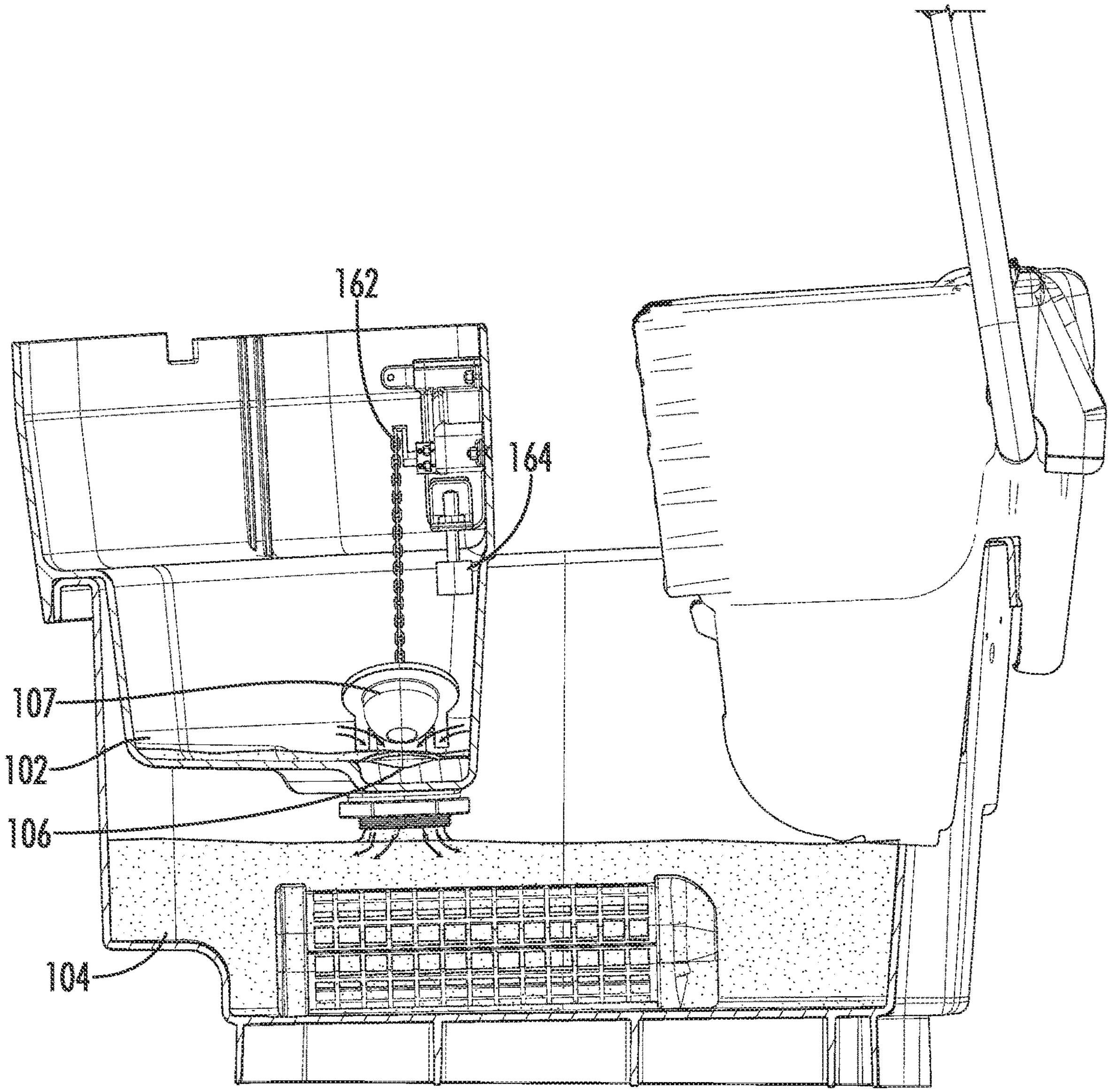
FIG. 11 is a sectional view thereof.

FIG. 11 shows flapper valve 107 opened to flush water from the first reservoir 102 to the second reservoir 104. The water flows through the draining aperture 106 to drain the fluid from the first reservoir 102 to the second reservoir. The fluid level in first reservoir 102 lowers due to the opened flapper valve 107 allowing the fluid to flow from the first reservoir 102 through the drain aperture 106 to the second reservoir 104.

The lower level of fluid in the first reservoir 102 causes the float switch 164 to no longer float. The float switch 164 detects the low water level. The float switch 164 activates the pump and filtration system 156 to transfer fluid from the second reservoir 104 to the first reservoir. The filtration system 156 filters the fluid prior to releasing the fluid into the first reservoir 102.

In one embodiment, the system detects the level of fluid in the second reservoir 104. If the fluid level in the second reservoir 104 is insufficient, the system may not activate the pump to prevent burning up or otherwise damaging the pump.

Figure 12:
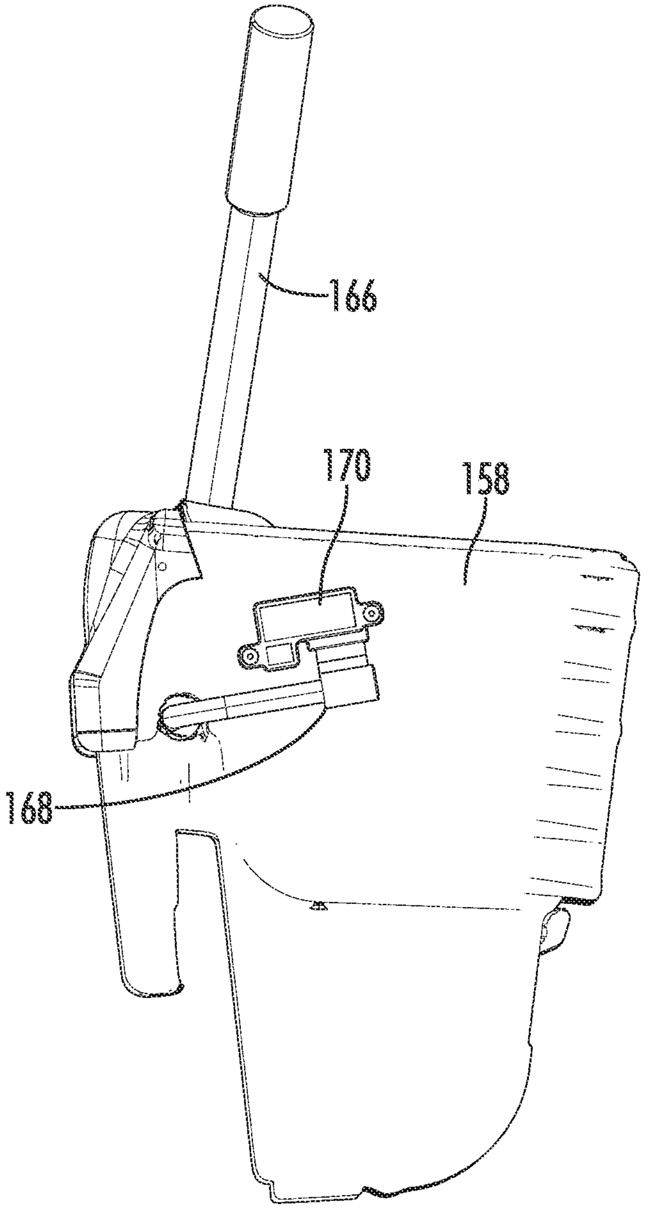
FIG. 12 is a side view of a wringer of one embodiment of the present invention.
Figure 13:
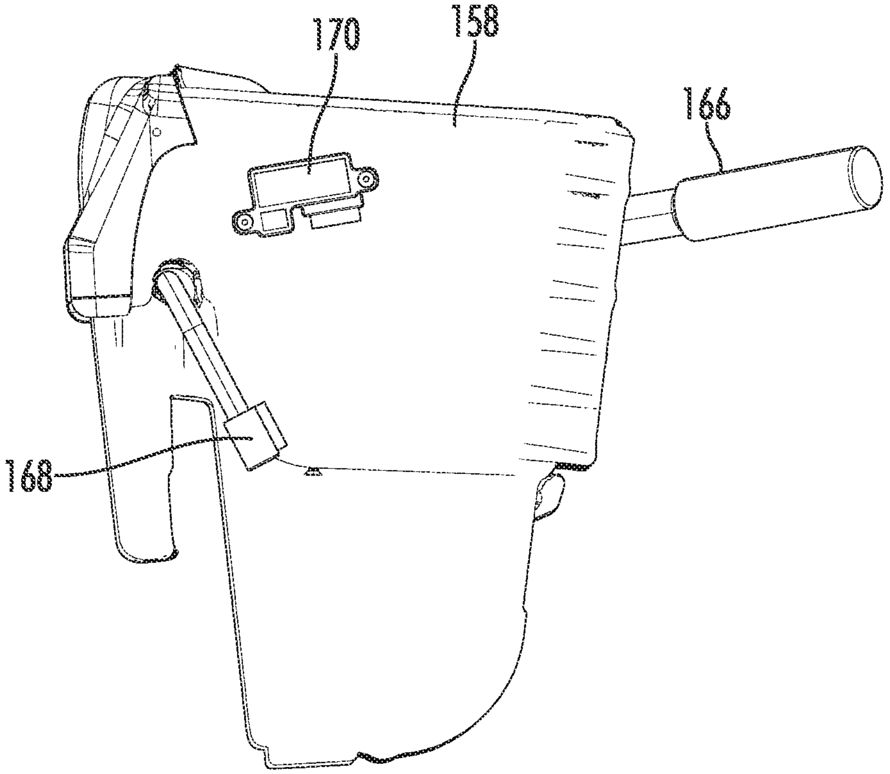
FIG. 13 is a side view thereof.

FIGS. 12 and 13 show the wringer 158 of one embodiment. Such an embodiment includes wring detection 170 and switch 168 connected to wringer handle 166. The user adjusts wringer handle 166 to wring the mop or other cleaning device. As the user manipulates wringer handle 166, the wring detection 170 and switch 168 contact and separate to indicate wringing of the mop.

FIG. 12 shows the wring detection 170 and switch 168 contacting each other to make the connection, such as an electrical connection. During such connection, the computerized flushing system does not instruct the actuator to flush the first reservoir 102. Contacting wring detection 170 with the switch 168 indicates that the mop is not being wrung.

FIG. 13. shows separation of the wring detection 170 from the switch 168. Such separation indicates wringing of the mop as the wringer handle 166 is moved to the wring position. Moving the wringer handle 166 to the wring position separates the switch 168 from the wring detection 170. Separating switch 168 from the wring detection 170 disconnects the switch 168 from wring detection 170.

Disconnecting the switch 168 from the wring detection 170 indicates wringing of the mop. Wringing of the mop opens the flapper valve. Disconnecting the switch 168 from the wring detection 170 causes the actuator to open the flapper valve. Opening the flapper valve releases fluid from the first reservoir to the second reservoir.

Figure 14:
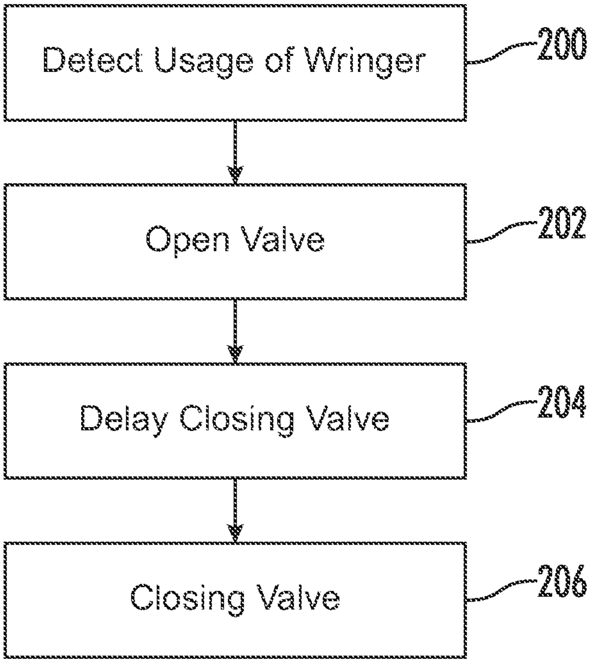
FIG. 14 is a flow chart of one embodiment of the present invention.

FIG. 14 shows the process of opening the flush body, such as the flapper valve, via the wring detection. The system, via computer or other electronics, including a printed circuit board. The electronics detect usage of the wringer at Detect Usage Step 200. Such detection may occur via the wring detection as described above.

The electronics send an instruction to activate the actuator to open the flush body, such as the flapper valve, at Open Flush Valve Step 202. Opening the flapper valve drains the fluid from the first reservoir to the second reservoir. Because draining the first reservoir may require some time, the actuator may delay closing the flapper valve at Delay Closing Valve 204. The actuator maintains the flapper valve open for sufficient time to allow for complete draining of the first reservoir.

Because the flapper valve remains open, the float switch will lower due to the reduced fluid levels within the first reservoir. The float switch activates the pump to bring filtered water/fluid into the first reservoir. Maintaining the flapper valve open, the actuator provides the pump with sufficient time to rinse the first reservoir. The pump continues to rinse first reservoir with the filtered water/fluid while the flapper valve is open. The pump rinses the dirt, debris, sand, and other particulates that may remain in the first reservoir after draining of the first reservoir. After sufficient time, the actuator closes the valve at Close Valve 206.

Figure 15:
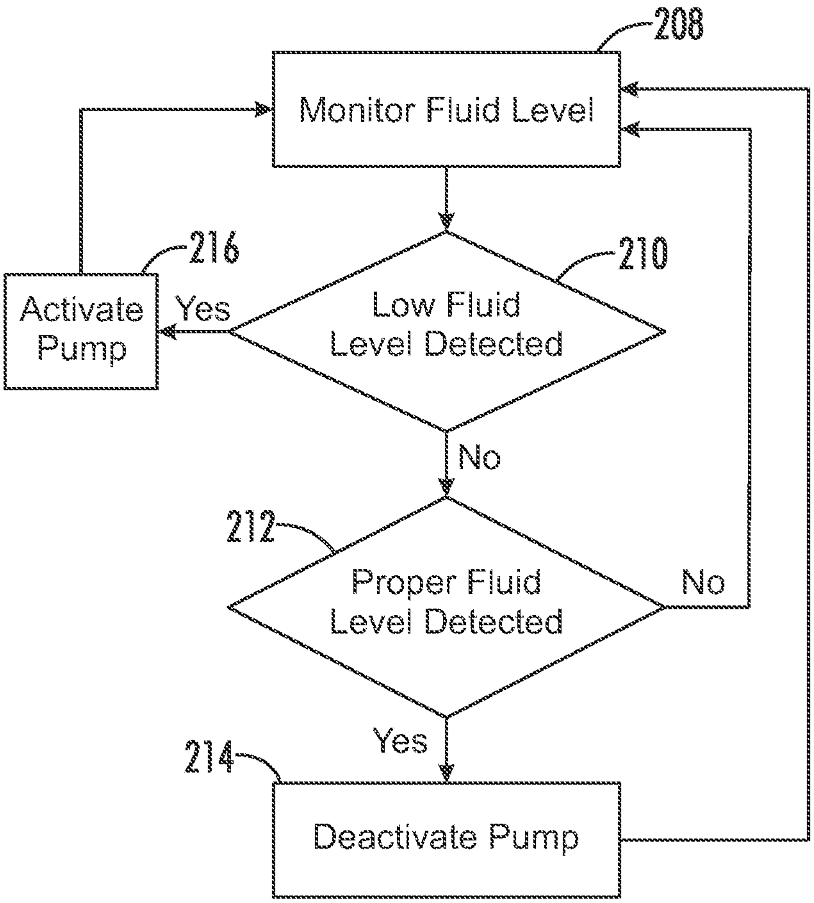
FIG. 15 is a flow chart of one embodiment of the present invention.

FIG. 15 shows the process of activating the pump via the electronics, such as the computer and PCB described above. The float switch discussed above monitors the water level at Monitor Water Level 208. As discussed above, the float switch detects whether the pump should be activated to increase the fluid level within the first reservoir.

The float switch detects whether the water/fluid in the first reservoir is low. If the float switch detects low fluid within the first reservoir at Low Fluid Detected Query 210, the float switch activates the pump at Activate Pump 216 to transfer fluid from the second reservoir to the first reservoir and filter the fluid prior to releasing the fluid in the first reservoir. In one embodiment, the pump only pumps if sufficient fluid supply is in the second reservoir. If insufficient fluid is available in the second reservoir, the pump does not operate to avoid damaging the pump.

If the proper level of fluid is within the first reservoir at Proper Fluid Level Detected Query 212, the float switch instructs the deactivation of the pump at Deactivate Pump Step 214. Otherwise, the float switch continues to monitor the fluid level within the first reservoir at Monitor Fluid Level 208.

In one embodiment, the electronics require monitoring low fluid levels within the first reservoir for a predetermined time, such as two seconds, prior to activating the pump. Because the user will be moving the mopping system, the water may slosh around and detect false low fluid levels. To avoid such false detections, one embodiment requires that the float switch remain at the low level for two seconds prior to activating the pump. In one embodiment, the system requires that the low level be identified for more than a second or more than the time required for a temporary drop of the float switch.

In one embodiment, the mopping system includes a communication system that allows the mopping system to connect to a network. The mopping system may communicate via the Internet, mobile carrier, SMS, or other types of communication. The communication system allows the mopping system to order additional supplies or equipment when needed. The electronics may track the amount of cleaning solution used by the mopping system. Each mopping system is associated with an identifier. The system tracks the amount of cleaning solution used. When the system detects that the user may have used all of the cleaning solution has been used, the mopping system may order and pay for the additional cleaning solution or supplies.

Other filtration systems can be implemented in the present invention. In one embodiment, a single filter provides multiple different stages within the single filter. The different layers of the single filter provide different sized filtering of the water. The single filter filters the water from the waste water tank to the filtered tank. The single filter may be placed before the pump or after the pump. In one embodiment, the single filter provides different layers that filter at different microns at each level. Such layers may range from 0.2 microns to 1000 microns.

These filter(s) may be removable from the system to be replaced. In some embodiments, the user may wash the filters and reuse the cleaned filters. The filtration system provides a convenient method of removing and replacing the filters within the filtration system.

The present invention may also provide a mesh screen to remove debris from the first reservoir and the second reservoir. The mesh screen may be placed within a filter housing of the present invention. The mesh screen could also be installed with the second reservoir for filtering contaminants from the water.

The system may also implement ultraviolet light or other light to kill bacteria, clean, or otherwise treat the water. The system may also implement an ionization technique within the water to kill bacteria, clean, or otherwise treat the water. The system may also provide a dispenser that dispenses cleaning solution or other substance that may assist with collecting debris or otherwise cleaning the water.

Another embodiment of the present invention may provide alternative filters, such as specialty filters. Such filters may include oil filters, grease filters, etc. Such a filter may include an organoclay filter that removes oils, grease, and other substance from the water. The different types of filters may be implemented based upon the environment in which the system is used.

Another embodiment of the present invention may provide a first reservoir and second reservoir that are secured to each other. Another embodiment provides a first reservoir and second reservoir that are detachable from each other. The first reservoir and second reservoir are placed to allow the water to circulate between the first reservoir and the second reservoir.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A filtration system in a mopping system for filtering a liquid for cleaning a floor, the filtration system comprising:

a first reservoir for storing the liquid;

a second reservoir that receives liquid from the first reservoir;

a draining aperture within the first reservoir that directs the liquid from the first reservoir to the second reservoir, wherein the draining aperture gravity feeds the liquid from the first reservoir downward into the second reservoir;

a valve blocking the draining aperture of the first reservoir, wherein the valve adjusts between a closed position that reduces liquid flowing through the draining aperture into the second reservoir and an open position that releases liquid from the first reservoir through the draining aperture into the second reservoir;

a pump that circulates liquid from the second reservoir to the first reservoir;

a first filter wherein the pump directs the liquid from the second reservoir through the first filter into the first reservoir to filter the liquid prior to pumping the liquid into the first reservoir;

an actuator attached to the valve, wherein the actuator exerts an opening force on the valve to open the valve, wherein the actuator stops exerting the opening force to close the valve.

2. The system of claim 1 further comprising:

a lip located radially outward from the draining aperture, wherein the lip extends vertically above the draining aperture;

a valve recess located adjacent the lip, the valve recess extending downward into a lower surface of the first reservoir;

wherein the valve recess at least partially surrounds the lip, wherein the valve recess is located vertically below the lip.

3. The system of claim 1 further comprising:

wherein the valve is a flapper valve, wherein the actuator pivots the flapper valve upward to the open position.

4. A filtration system in a mopping system for filtering a liquid for cleaning a floor, the filtration system comprising:

a first reservoir for storing the liquid;

a second reservoir that receives liquid from the first reservoir, wherein the first reservoir is positioned above the second reservoir;

wherein the first reservoir is secured in a fixed position in relation to the second reservoir;

a draining aperture within the first reservoir that directs the liquid from the first reservoir to the second reservoir, wherein the draining aperture is positioned vertically above the second reservoir to gravity feed liquid from the first reservoir downward into the second reservoir;

a pump that circulates liquid from the second reservoir to the first reservoir, wherein the pump directs liquid from the second reservoir to the first reservoir;

a first filter wherein the pump directs liquid from the second reservoir through the first filter to the first reservoir before releasing the liquid from the second reservoir into the first reservoir;

a flapper valve blocking the draining aperture of the first reservoir wherein opening the flapper valve gravity feeds the liquid from the first reservoir into the second reservoir; and an attachment post secured to the first reservoir, wherein the flapper valve attaches to the attachment post, wherein the flapper valve pivots in relation to the attachment post to adjust between the open position and the closed position.

5. The system of claim 4 further comprising:

an actuator that attaches to the flapper valve, wherein the actuator opens the flapper valve.

6. The system of claim 5, wherein the actuator is electronically controlled to open the flapper valve.

7. The system of claim 6, wherein the actuator is programmed to pivot the flapper valve to the open position for a predetermined time period.

8. The system of claim 6, wherein the actuator maintains the flapper valve open for a defined period of time, wherein the actuator overcomes gravitational forces to maintain the flapper valve open after the flapper valve should naturally close.

9. The system of claim 6 further comprising:

a wringer that directs liquid into the second reservoir;

a wring detection that detects use of the wringer, wherein the actuator opens the flapper valve upon the wring detection detecting use of the wringer.

10. The system of claim 4 further comprising:

a float switch in the first reservoir, wherein the float switch detects a level of the fluid within the first reservoir, wherein the float switch instructs the pump to transfer fluid from the second reservoir to the first reservoir upon detecting a low level of fluid within the first reservoir, wherein the float switch instructs the pump to stop transferring fluid from the second reservoir to the first reservoir upon detecting sufficient level of fluid within the first reservoir.

11. A filtration system in a mopping system for filtering a liquid for cleaning a floor, the filtration system comprising:

a first reservoir for storing the liquid;

a second reservoir that receives the liquid from the first reservoir;

a draining aperture within the first reservoir that directs the liquid from the first reservoir to the second reservoir wherein the draining aperture is secured above a lower surface of the second reservoir to gravity feed liquid from the first reservoir downward directly into the second reservoir;

a valve blocking the draining aperture of the first reservoir wherein the valve adjusts between a closed position that reduces liquid flowing through the draining aperture into the second reservoir and an open position that releases liquid from the first reservoir through the draining aperture into the second reservoir;

a pump that circulates liquid from the second reservoir to the first reservoir;

a first filter wherein the pump directs the liquid from the second reservoir through the first filter into the first reservoir;

a motor that attaches to the valve, wherein the motor exerts an opening force to open the the valve, wherein the motor stops exerting the opening force to close the valve.

12. The system of claim 11, wherein the valve is a flapper valve, wherein the opening force from the motor pivots the flapper valve to the open position, wherein the valve pivots to close after the motor stops exerting the opening force.

13. The system of claim 1, wherein the pump directs liquid from the second reservoir into the first reservoir while the actuator opens the valve.

14. The system of claim 1, wherein the pump directs liquid from the second reservoir into the first reservoir while the valve remains open.

15. The system of claim 14, wherein the actuator exerts the opening force for a predetermined time period for opening the valve before the actuator stops exerting the opening force to close the valve.

16. The system of claim 15, wherein the actuator maintains the valve open for the predetermined time, wherein the actuator overcomes gravitational forces to maintain the flapper valve open after the flapper valve should close.

17. The system of claim 11, wherein the pump directs liquid from the second reservoir into the first reservoir while the valve remains open.

18. The system of claim 11, wherein the motor is electronically controlled to open the valve;

wherein the motor exerts the opening force for a predetermined time period for opening the valve before the actuator stops exerting the opening force to close the valve by gravitation.

19. The system of claim 11, wherein the pump directs liquid from the second reservoir into the first reservoir while the motor opens the valves.

20. The system of claim 2, wherein the lip is angled downwards.

21. The system of claim 2, wherein the valve recess is angled downwards.

22. The system of claim 2, wherein the lip and the valve recess are angled downwards.

* * * * *